US009964040B2

(12) United States Patent
Jones et al.

(10) Patent No.: US 9,964,040 B2
(45) Date of Patent: May 8, 2018

(54) SPIRAL COOLING OF COMBUSTOR TURBINE CASING AFT PLENUM

(71) Applicant: Siemens Energy, Inc., Orlando, FL (US)

(72) Inventors: Russell B. Jones, North Palm Beach, FL (US); Ross Peterson, Palm Beach Gardens, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 581 days.

(21) Appl. No.: 14/870,895

(22) Filed: Sep. 30, 2015

(65) Prior Publication Data

US 2017/0089264 A1   Mar. 30, 2017

(51) Int. Cl.
| | | |
|---|---|---|
| F02C 7/18 | (2006.01) | |
| F01D 9/06 | (2006.01) | |
| F01D 25/12 | (2006.01) | |
| F01D 25/16 | (2006.01) | |
| F01D 25/26 | (2006.01) | |

(52) U.S. Cl.
CPC .............. *F02C 7/185* (2013.01); *F01D 9/065* (2013.01); *F01D 25/12* (2013.01); *F01D 25/162* (2013.01); *F01D 25/26* (2013.01); *F05D 2250/15* (2013.01); *F05D 2260/221* (2013.01); *F05D 2260/22141* (2013.01)

(58) Field of Classification Search
CPC .......... F02C 7/185; F01D 9/065; F01D 25/12; F01D 25/162; F01D 25/26; F05D 2250/15; F05D 2260/221; F05D 2260/22141
See application file for complete search history.

(56) References Cited

U.S. PATENT DOCUMENTS

| | | | |
|---|---|---|---|
| 5,167,488 A | 12/1992 | Ciokajlo et al. | |
| 8,307,654 B1 | 11/2012 | Liang | |
| 9,316,108 B2 * | 4/2016 | Pegan, Jr. | ............. F01D 25/162 |
| 2005/0132715 A1 * | 6/2005 | Allen, Jr. | ................. F01D 9/00 60/796 |
| 2010/0170259 A1 * | 7/2010 | Huffman | ................. F01D 9/023 60/755 |

(Continued)

FOREIGN PATENT DOCUMENTS

EP   1512844 A2   3/2005

OTHER PUBLICATIONS

PCT International Search Report and Written Opinion of International Searching Authority dated Dec. 20, 2016 corresponding to PCT International Application No. PCT/US2016/053661 filed Sep. 26, 2016.

*Primary Examiner* — William H Rodriguez

(57) ABSTRACT

A spiral cooling system for cooling an aft turbine casing of a gas turbine engine. The gas turbine engine includes a turbine casing having a fore end and an aft end, a star bearing support member supporting a bearing housing and including a plurality of struts each mounted to an aft flange at the aft end of the turbine casing. The turbine casing includes an outer casing wall and an inner casing wall at the aft end defining an airflow plenum therebetween that receives cooling air at an input end opposite to the aft flange. The spiral cooling system includes a plurality of fins secured to an inside surface of the outer wall and being spaced from the inner wall that directs the airflow from the input end in a circular manner around the plenum to an output end of the plenum.

17 Claims, 3 Drawing Sheets

(56) References Cited

U.S. PATENT DOCUMENTS

| | | | |
|---|---|---|---|
| 2012/0275900 A1* | 11/2012 | Snider | F01D 9/023 |
| | | | 415/108 |
| 2013/0149107 A1 | 6/2013 | Munshi et al. | |
| 2013/0224011 A1 | 8/2013 | Hashimoto | |
| 2014/0241865 A1* | 8/2014 | Arimatsu | F01D 25/12 |
| | | | 415/180 |
| 2015/0308344 A1* | 10/2015 | Vo | F01D 9/065 |
| | | | 415/213.1 |
| 2016/0208631 A1* | 7/2016 | Spangler | F01D 9/065 |
| 2016/0333739 A1* | 11/2016 | Vo | F01D 25/162 |
| 2017/0044907 A1* | 2/2017 | Spangler | F01D 5/188 |
| 2017/0211416 A1* | 7/2017 | Weaver | F01D 25/12 |

* cited by examiner

SPIRAL COOLING OF COMBUSTOR TURBINE CASING AFT PLENUM

BACKGROUND OF THE INVENTION

Field of the Invention

This invention relates generally to a spiral system for providing cooling air to a turbine casing in a gas turbine engine and, more particularly, to a spiral system that provides cooling air to a turbine casing in a gas turbine engine, where the system includes spirally configured fins mounted to an inside surface of the casing within a casing plenum to provide a longer path for the airflow to provide more cooling.

Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typical gas turbine engine includes a compressor section, a combustion section and a turbine section. The compressor section provides a compressed airflow to the combustion section where the air is mixed with a fuel, such as natural gas. The combustion section includes a plurality of circumferentially disposed combustors that receive the fuel to be mixed with the air and ignited to generate a working gas. The working gas expands through the turbine section and is directed across turbine blades therein by associated vanes. As the working gas passes through the turbine section, it causes the blades to rotate, which in turn causes a shaft to rotate, thereby providing mechanical work.

The turbine section of a typical gas turbine engine will include a plurality of rows of circumferentially disposed blades, such as four rows of blades, where the working gas is directed by a row of vanes across the blades from one stage of the blades to the next stage of the blades. It is generally desirable that the outer tip of the rotating blades be as close as possible to the static casing surrounding the blades, referred to in the art as tip clearance, so that a maximum amount of the working gas flows around the blades instead of flowing between the blades and the casing, which does not contribute to rotation of the blades, to provide improved blade performance. As the temperature of the engine goes up and down, the blades and casings expand and contract accordingly, which changes the tip clearance. Also, the centrifugal force from rotation of the blades causes the length of the blades to increase, which reduces the tip clearance. It is generally the tip clearance of the blades at system steady state operation that determines the performance of the blades and therefore of the engine. On the other hand, the tip clearances are also crucial in ensuring that the blades do not rub with static hardware during the startup and shutdown procedures of the engine because of different thermo-mechanical expansions and/or contractions of the blades and casings. Thus, tip clearances are set appropriately in an engine so as to derive the best performance and prevent tip rubbing.

Centering the turbine rotor within the gas turbine stationary casing is a challenge that affects the turbine blade tip clearances, and thus can negatively impact turbine performance. Lack of rotor center line positioning control during cold engine build and the subsequent control of the center line excursions under transient thermal and mechanical conditions forces the turbine blade to stator clearances to be set sufficiently large to prevent excessive rubbing or clashing, where these increased clearances result in loss of turbine efficiency and reduction in output power.

At the output of the turbine section, the working gas is passed through an exhaust gas diffuser that recovers the dynamic head of the exhaust gas for optimal performance of the turbine section. The exhausted gas, which is still very hot, is often times directed to other systems that may benefit from the available heat until the working gas is eventually exhausted to the environment or otherwise. For example, the hot exhaust gas at the output of the gas turbine engine may be used to boil water for a steam turbine engine, which also generates power in, for example, a combined cycle plant, well known to those skilled in the art. The configuration of the exhaust gas diffuser at the output of the gas turbine engine is important for the performance of the gas turbine blades because the exhaust gas diffuser partially blocks the gas flow from the turbine section.

The turbine rotor rotates on turbine bearings within a bearing housing. In one gas turbine engine design, a star member supports the turbine rotor downstream of the turbine section, where the star member includes a plurality of struts extending from a central annular portion and having ends that are secured to an aft flange of the turbine casing, and where the bearing housing is positioned within the annular portion. Hot exhaust gas flow, for example, in excess of 1200° F., from the turbine section of the engine flows through the star member around the struts.

Cooling air is pumped through a configuration of cooling channels in the turbine section so that the cooling air cools the outer turbine casing, and usually flows through channels in the star member struts to the bearing housing to cool the bearings therein to a desired operating temperature. Various cooling flow configurations for the design of the star support member and other components cause variations in temperature between different areas of the turbine casing and different struts in the star member. These temperature differentials cause deformities in the outer turbine casing as a result of the struts being secured at different locations to the aft flange of the casing that causes the casing to become out of round, which affects the tip clearance of the turbine blades. More particularly, because the struts are bolted to an aft flange of the turbine casing with heavy bolts, the different temperature struts provide different pressures to the casing causing the deformation of the casing, which changes the centering position of the turbine rotor.

SUMMARY OF THE INVENTION

The present disclosure describes a spiral cooling system for cooling an aft section of a turbine casing of a gas turbine engine. The gas turbine engine includes a star bearing support member that supports a bearing housing and includes a plurality of struts each mounted to an aft flange of the turbine casing. The turbine casing includes an outer casing wall and an inner casing wall defining an airflow plenum therebetween that receives cooling air at an input end opposite to the aft flange. The spiral cooling system includes a plurality of spiral fins secured to an inside surface of the outer wall casing and being spaced from the inner wall that directs the airflow from the input end in a circular manner around the plenum to an output end of the plenum.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a spiral cooling member having fins secured to an inner surface of a turbine casing plenum at an output section of a gas turbine engine is merely exemplary in nature, and is in no way intended to limit the invention or its applications or uses.

Figure 1:
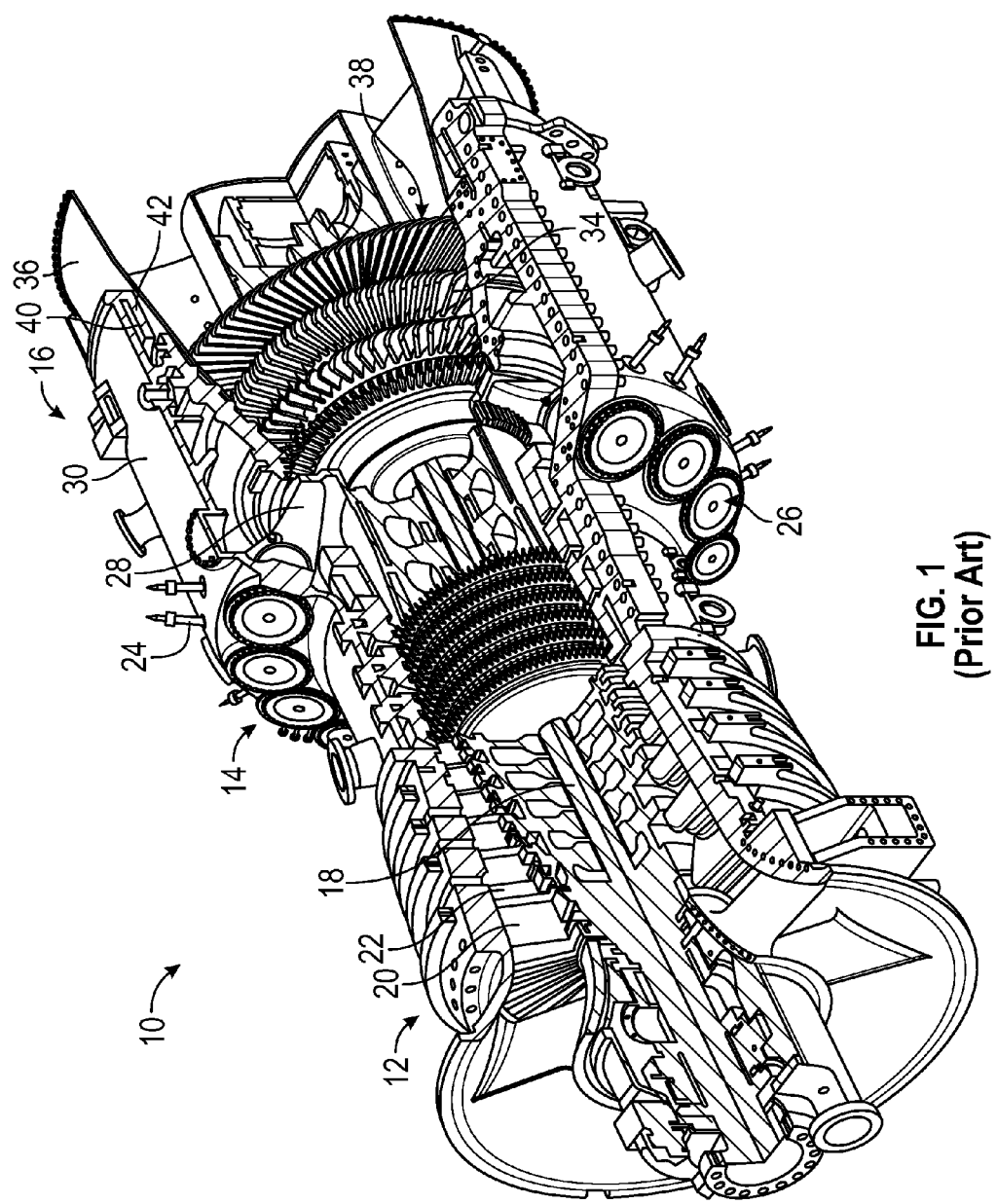
FIG. 1 is a cut-away, isometric view of a known gas turbine engine.

FIG. 1 is a cut-away, isometric view of a known gas turbine engine 10 including a compressor section 12, a combustion section 14 and a turbine section 16, where the combustion section 14 and the turbine section 16 are enclosed within an outer housing or casing 30, and where operation of the engine 10 causes a central shaft or rotor 18 to rotate, thus creating mechanical work. The engine 10 is illustrated and described by way of a non-limiting example to provide context to the invention discussed below. Those skilled in the art will appreciate that other gas turbine engine designs can also be used in connection with the invention. Rotation of the rotor 18 draws air into the compressor section 12 where it is directed by vanes 22 and compressed by rotating blades 20 to be delivered to the combustion section 14, where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown), mixed with the compressed air and ignited by an igniter 24 to be combusted to create the working gas, which is directed by a transition component 28 into the turbine section 16.

The working gas is then directed by circumferentially disposed stationary vanes (not shown in FIG. 1) in the turbine section 16 to flow across circumferentially disposed rotatable turbine blades 34, which causes the turbine blades 34 to rotate, thus rotating the rotor 18. Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Once the working gas passes through the turbine section 16 it is output from the engine 10 as a hot exhaust gas through an exhaust gas diffuser 36. Many of the components in the turbine section 16 include channels that receive an airflow for cooling the various turbine parts so as to increase turbine performance and longevity. One of those flow channels is defined generally herein as an annular plenum 40 provided at an output end of the casing 30 proximate the diffuser 36 and defined by the casing 30 and an inner wall 42.

Figure 2:
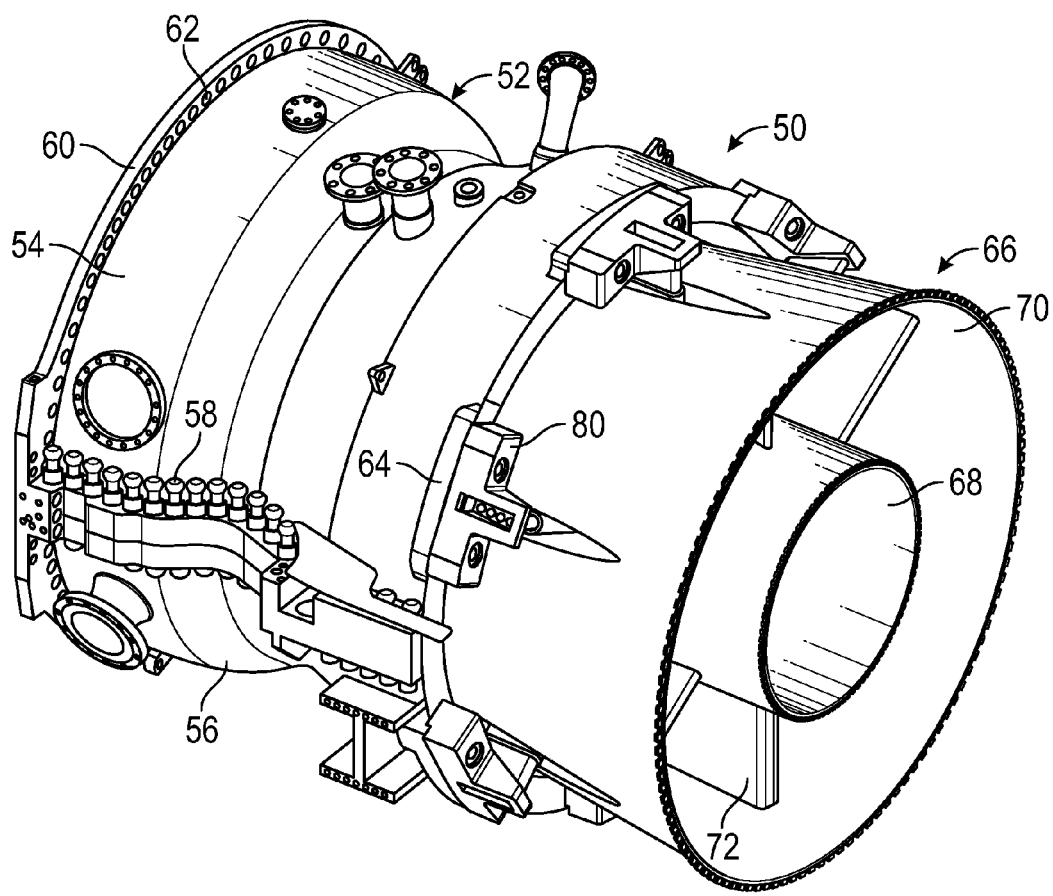
FIG. 2 is an isometric view of a turbine section casing and exhaust gas diffuser for a gas turbine engine.

FIG. 2 is an isometric view of an end section 50 of a gas turbine engine, which could generally be the end section of the gas turbine engine 10 including the turbine section 16 and the exhaust gas diffuser 36. The end section 50 includes a turbine casing 52 representing the casing 30, where the casing 52 is a split casing having an upper casing section 54 and a lower casing section 56 secured together by bolts 58. The casing 52 includes a mounting flange 60 having bolt holes 62 to accept bolts (not shown) for coupling the casing 52 to a forward section of the turbine engine in a manner well understood by those skilled in the art, and an aft flange 64. An exhaust diffuser 66 including an inner liner 68 and an outer liner 70 having support members 72 therebetween, representing the diffuser 36, is mounted to and extends from the casing 52 opposite to the flange 60, and would be positioned proximate to the last row of turbine blades in a manner also well understood by those skilled in the art.

The end section 50 includes a star support member of the type referred to above including a center annular portion (not shown) and a plurality of struts coupled thereto each including a hammer head end 80 mounted to the aft flange 64. As discussed above, the annular portion supports a bearing housing (not shown) through which the rotor 18 extends. Air from, for example, the plenum 40 is distributed to cooling flow channels in the struts that direct the airflow to the annular portion of the star support member to cool the bearing housing in a manner well understood by those skilled in the art. The flow of cooling air into the plenum 40 attempts to control the temperature of the outer casing 52 so that it is maintained at the same temperature so that the casing 52 stays in a round configuration during operation of the engine, which allows tighter tip clearances. However, as discussed above, current turbine engine designs can be improved to maintain the temperature of the casing 52 consistent.

In the typical arrangement of a turbine engine having a split upper and lower turbine casing half, the flanges of the casing introduce non-uniform thermal behavior. The cooling air delivered to the star support member travels in the plenum 40 that is dominated by radiation heat load from the turbine gas path liner within. The radiation heat load causes a mismatch in thermal response and top to bottom case temperature gradients, and forces loads to be transmitted to the star support member. This mismatch in temperature can cause loss of engagement of the casing 52 to the hammer head end 80, and thus misalignment of the rotor 18 and static structure center lines. This loss of centering causes tip rubs or forces turbine tip clearances to be enlarged at build resulting in loss of turbine performance.

As will be discussed in detail below, the present invention proposes providing a spiral cooling system circumferentially disposed within the plenum of the casing 52 so that cooling air introduced into the plenum flows spirally around the casing 52 so as to have a longer path than the known cooling systems so as to provide more convection and conduction to enable more affective cooling, which maintains the temperature of the entire casing 52 consistent so that it stays in a round configuration at system operating temperatures. Spiral outer diameter wall dividers or fins in the spiral cooling system allow for cooling air to be introduced to forward spirals at the forward end of the turbine casing 52 to heat the air before entering the support star struts. The additional surface area augments the cooling benefit of the turbine casing 52 and provides a barrier to prevent buoyancy effects on turning gear operation.

The spiral cooling system allows for the cooling air flow to have augmented convective heat transfer to the turbine casing 52. The heat pickup from the casing 52 to the cooling air delivers warmer air to the downstream star support member, and thus improves the thermal matching. The increased velocity and the spiral cooling path is desired to overcome the bouncy affect in the air and is allowed to circulate in the plenum 40. Maldistribution of temperature between the upper and lower casing sections 54 and 56 is avoided and tighter turbine clearance can be maintained. These improved thermal responses lead to improved running and transit tip clearance control and results in improved turbine performance.

The spiral cooling system is implemented by attaching a spiral sheet to the interior of the upper and lower casing sections 54 and 56 at the turbine casing outer wall 52. The intersection at the split line is aligned such that flow guided in a continuous fashion in the assembled condition. Cooling air is introduced into the passage from the upstream side of the passage, and is driven by a pressure gradient around the spiral fins and discharges through an array of cooling cross-over holes to the star member.

The spiral passages can be set to make partial rotations up to a full 360° revolution or more. The air from each cooling feed would then spiral through its passage and be delivered to the discharge cooling cross-over hole at the opposite end of the casing 52 from the feed holes. The increased surface area provided by the spiral fins combines with the augmented convective performance by increasing the fluid velocity in a spiral nature that results in an improved uniform circumferential cooling response for the turbine casing 52. The heat pick-up from the augmented cooling provides for thermal matching of the bearing star member thermal response and an improved structural centering. This thermal and mechanical improved centering allows for tighter turbine tip clearances and improved turbine performance.

Figure 3:
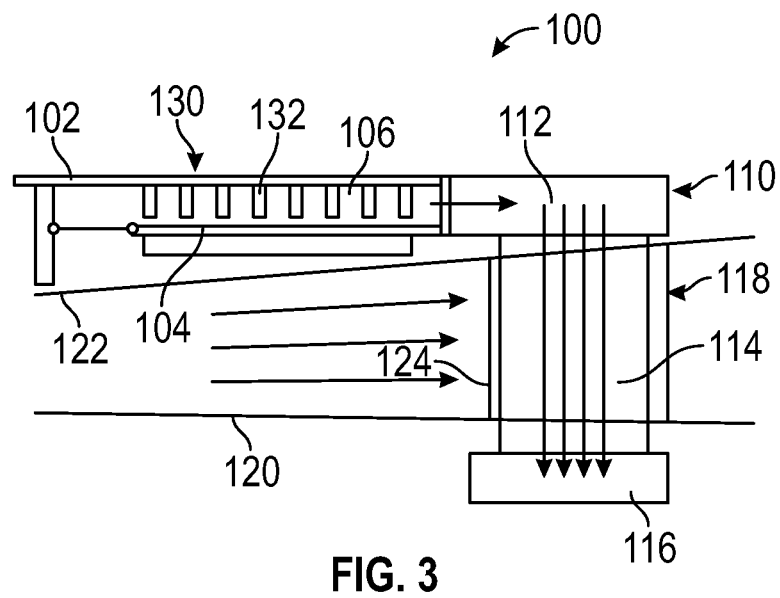
FIG. 3 is a simplified illustration of a portion of a turbine engine showing a spiral cooling member in a turbine casing.

FIG. 3 is a simplified illustration 100 of a portion of the section 50 that shows the spiral cooling system discussed above. In the illustration 100, an outer wall 102 represents the turbine casing 52, an inner wall 104 represents the wall 42 in FIG. 1, and a plenum 106 represents the plenum 40 in FIG. 1. The outer wall 102 is mounted to a star support member 110, and includes hammer head ends 112, struts 114 and an annular center portion 116. An exhaust gas diffuser 118 including an inner liner 120 and an outer liner 122 with support members 124 therebetween represents the diffuser 66. As discussed above, a spiral member 130 is positioned within the plenum 106 and includes a series of fins 132 that are welded to an inner surface of the outer wall 102 and spaced from the inner wall 104 in this non-limiting design. Cooling air enters the plenum 106 at the left end of the member 130 and is directed by the fins 132 to spirally flow around the plenum 106 to provide uniform cooling to the outer casing wall 102, where it is periodically discharged into flow channels in the ends 122 of the star member 120.

In this non-limiting embodiment, the fins 132 are rectangular pieces of metal that are welded at an angle to the inside surface of the outer casing wall 102 so that the cooling flow from the forward end of the plenum 106 is directed inward toward the aft end of the plenum 106, and is able to discharge into flow channels in each of the ends 122. It is noted that any suitable length of the fins 132, any angular orientation of the fins 132, any height of the fins 132, any thickness of the fins 132 and any spacing of the fins 132 consistent with the discussion herein can be employed within the scope of the present invention.

Figure 4:
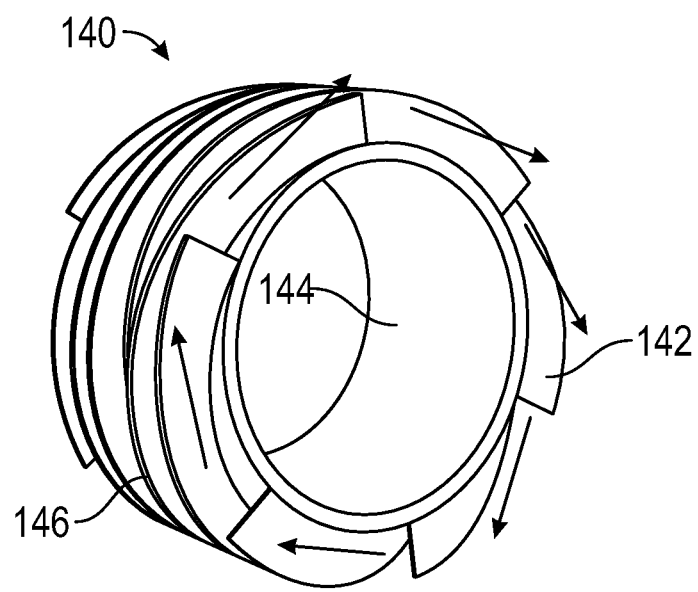
FIG. 4 is a depiction of the spiral cooling member separated from the turbine casing.

FIG. 4 is an isometric view of a spiral member 140 illustrating one conceptual configuration of the spiral member 130. The spiral member 140 includes a plurality of spaced apart and specifically oriented fins 142 attached to a common central cylindrical member 144 and defining channels 146 therebetween. This configuration is merely for representative purposes to show one possible orientation of the fins 142, where in the embodiment discussed above, the fins 142 would be coupled to the outer casing wall 102 and not the inner casing wall 104.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A spiral cooling system for a gas turbine engine, said gas turbine engine including a turbine casing having a fore end and an aft end, said gas turbine engine further including a star bearing support member supporting a bearing housing and including a plurality of struts each mounted to an aft flange at the aft end of the turbine casing, said turbine casing including an outer casing wall and an inner casing wall at the aft end defining an airflow plenum therebetween, said airflow plenum receiving cooling air at an input end opposite to the aft flange, said system including a plurality of fins positioned within the plenum and directing the airflow from the input end in a circular manner around the plenum to an output end of the plenum, wherein the plurality of fins direct the airflow to cooling channels within ends of the struts that are mounted to the aft flange.

2. The system according to claim 1 wherein the plurality of fins are secured to an inside surface of the outer wall and being spaced from the inner wall.

3. The system according to claim 2 wherein the plurality of fins are metal fins welded to the inside surface of the outer wall.

4. The system according to claim 1 wherein the plurality of fins are configured to cause the airflow to make a partial revolution around the turbine casing.

5. The system according to claim 1 wherein the plurality of fins are configured to cause the airflow to make a full 360° revolution around the turbine casing.

6. The system according to claim 1 wherein the turbine casing is a split casing.

7. A spiral cooling system for a gas turbine engine, said gas turbine engine including a turbine casing having a fore end and an aft end, said gas turbine engine further including a star bearing support member supporting a bearing housing and including a plurality of struts each mounted to an aft flange at the aft end of the turbine casing, said turbine casing including an outer casing wall and an inner casing wall at the aft end defining an airflow plenum therebetween, said airflow plenum receiving cooling air at an input end opposite to the aft flange, said system including a plurality of fins positioned within the plenum and secured to an inside surface of the outer casing wall and being spaced from the inner casing wall, wherein the fins direct the airflow from the input end in a circular manner around the plenum to an output end of the plenum and to cooling channels within ends of the struts that are mounted to the aft flange.

8. The system according to claim 7 wherein the plurality of fins are metal fins welded to the inside surface of the outer wall.

9. The system according to claim 7 wherein the plurality of fins are configured to cause the airflow to make a partial revolution around the turbine casing.

10. The system according to claim 7 wherein the plurality of fins are configured to cause the airflow to make a full 360° revolution around the turbine casing.

11. The system according to claim 7 wherein the turbine casing is a split casing.

12. A gas turbine engine comprising:
a shaft provided along a center line of the turbine engine;
a compressor section responsive to a working fluid and being operable to compress the working fluid to produce a compressed working fluid;
a combustion section in fluid communication with the compressor section that receives the compressed working fluid, said combustion section including a plurality of combustors that mix the compressed working fluid with a fuel and combust the compressed fluid and fuel mixture to produce a hot working gas; and
a turbine section in fluid communication with the combustion section, said turbine section including a turbine casing having a fore end and an aft end, said turbine section further including a star bearing support member supporting a bearing housing and including a plurality of struts each mounted to an aft flange at the aft end of the turbine casing, said turbine casing including an outer casing wall and an inner casing wall at the aft end defining an airflow plenum therebetween, said airflow plenum receiving cooling air at an input end opposite to the aft flange, said turbine section further including a spiral cooling system including a plurality of fins positioned within the plenum and directing the airflow from the input end in a circular manner around the plenum to an output end of the plenum.

13. The engine according to claim 12 wherein the plurality of fins are secured to an inside surface of the outer wall and being spaced from the inner wall.

14. The engine according to claim 12 wherein the plurality of fins are configured to cause the airflow to make a partial revolution around the turbine casing or make a full 360° revolution around the turbine casing.

15. The engine according to claim 12 wherein the plurality of fins direct the airflow to cooling channels within ends of the struts that are mounted to the aft flange.

16. The engine according to claim 12 wherein the plurality of fins are metal fins welded to the inside surface of the outer wall.

17. The engine according to claim 12 wherein the turbine casing is a split casing.

* * * * *